(12) United States Patent
Bourque

(10) Patent No.: US 9,285,192 B2
(45) Date of Patent: Mar. 15, 2016

(54) BALLISTIC STRIKE PLATE AND ASSEMBLY

(71) Applicant: Bourque Industries, Phoenix, AZ (US)

(72) Inventor: John M. Bourque, Tucson, AZ (US)

(73) Assignee: Bourque Industries, Phoenix, AZ (US)

( * ) Notice: Subject to any disclaimer, the term of this patent is extended or adjusted under 35 U.S.C. 154(b) by 210 days.

(21) Appl. No.: 13/771,062

(22) Filed: Feb. 19, 2013

(65) Prior Publication Data

US 2014/0026740 A1 Jan. 30, 2014

Related U.S. Application Data

(63) Continuation of application No. 12/830,798, filed on Jul. 6, 2010, now Pat. No. 8,375,840, which is a continuation-in-part of application No. 12/613,902, filed on Nov. 6, 2009, now abandoned.

(51) Int. Cl.
| | |
|---|---|
| *F41H 5/04* | (2006.01) |
| *C22C 14/00* | (2006.01) |
| *C22C 21/00* | (2006.01) |
| *B32B 15/04* | (2006.01) |

(52) U.S. Cl.
CPC ............... *F41H 5/0464* (2013.01); *B32B 15/04* (2013.01); *C22C 14/00* (2013.01); *C22C 21/00* (2013.01)

(58) Field of Classification Search
CPC ........... F41H 5/02; F41H 1/02; F41H 5/0428; F41H 5/0471; F41H 5/0492; F41H 5/0464; F41H 5/0435; F41H 5/007; F41H 1/00; F41A 21/44; B32B 15/04
USPC ...................................................... 89/36.02
See application file for complete search history.

(56) References Cited

U.S. PATENT DOCUMENTS

| | | | | |
|---|---|---|---|---|
| 3,790,406 | A | | 2/1974 | Sakai et al. |
| 5,260,018 | A | * | 11/1993 | Dinger .................... C08K 3/08 419/31 |
| 5,272,954 | A | * | 12/1993 | Crouch .................. F41H 5/0457 109/49.5 |
| 6,085,965 | A | * | 7/2000 | Schwartz ................ B22F 7/006 228/190 |
| 7,216,576 | B2 | * | 5/2007 | Henry ................... F41H 5/0492 109/49.5 |
| 8,375,840 | B2 | * | 2/2013 | Bourque ................. C22C 14/00 89/36.02 |
| 2004/0216595 | A1 | | 11/2004 | Dickson |
| 2004/0258604 | A1 | | 12/2004 | Ryzhkov |
| 2005/0066805 | A1 | | 3/2005 | Park et al. |

FOREIGN PATENT DOCUMENTS

| | | |
|---|---|---|
| JP | 4323301 A | 11/1992 |
| JP | 2000515585 A | 11/2000 |

(Continued)

*Primary Examiner* — Joshua Freeman
*Assistant Examiner* — Bridget Cochran
(74) *Attorney, Agent, or Firm* — The Webb Law Firm

(57) ABSTRACT

A ballistic strike plate assembly comprises a first plate formed from aluminum alloy and having a first surface and a second surface. A titanium plate is has a first surface and a second surface. A sheet of ballistic gap foam is adhered to the first surface of the first plate and the first surface of the titanium plate. A multilayer ballistic fabric plate is adhered to the second surface of the titanium plate. A first sheet of ballistic wrap is disposed over the multilayer ballistic fabric plate, and has edges extending beyond edges of the multilayer ballistic fabric plate that are folded over the edges of the multilayer ballistic fabric plate. A second smaller sheet of ballistic wrap is adhered to the portion of the second surface of the first plate not covered by the folded over edges of the first sheet of ballistic wrap.

22 Claims, 3 Drawing Sheets

(56) References Cited

FOREIGN PATENT DOCUMENTS

| | | |
|---|---|---|
| JP | 2010521639 A | 6/2010 |
| WO | 9922195 A1 | 5/1999 |
| WO | 2004094700 A1 | 11/2004 |
| WO | 2006135735 A2 | 12/2006 |
| WO | 2008133735 A2 | 11/2008 |

* cited by examiner

BALLISTIC STRIKE PLATE AND ASSEMBLY

CROSS-REFERENCE TO RELATED APPLICATIONS

This application is a continuation of U.S. patent application Ser. No. 12/830,798 filed Jul. 6, 2010, now U.S. Pat. No. 8,375,840, which is a continuation-in-part of co-pending U.S. patent application Ser. No. 12/613,902, filed Nov. 6, 2009, the entirety of which is incorporated by reference herein.

BACKGROUND OF THE INVENTION

1. Field of the Invention

The present invention relates to ballistic strike plates, especially body armor plates and other protective ballistic strike plates, assemblies of ballistic strike plates including body armor plates and other protective ballistic strike plates, as well as methods for making these products.

2. The Prior Art

Body armor and other protective armor for similar applications is usually formed from a series of plates each comprising a plurality of layers of different materials. Materials such as alloyed ceramics have been successfully employed in body armor plates. In addition, metal plates, formed from, for example, titanium, have been employed in ballistic strike plates and ballistic strike plate assemblies. Co-pending U.S. patent application Ser. No. 12/613,902, filed Nov. 6, 2009, entitled "SOLID COMPOSITION HAVING ENHANCED PHYSICAL AND ELECTRICAL PROPERTIES," discloses multi-layer ballistic strike plate assemblies.

BRIEF DESCRIPTION

A treating wash comprises acetone, brass granules, carbon nanotube material, silver granules, iron pyrite granules, and copper granules. A method of making a treating wash includes mixing brass granules with acetone, mixing silver granules, carbon nanotube material, iron pyrite granules and copper granules in the acetone brass mixture, and straining the liquid from the remaining solid material. Methods of treating materials such as brass granules, iron pyrite granules, carbon nanotube material, and brass granules comprise washing the materials in the treating wash, followed by straining and drying the treated materials.

According to one aspect of the present invention, plates formed from an aluminum alloy are advantageously employed in ballistic strike plate assemblies assemblies, especially body armor assemblies. The alloy is composed of treated material, prepared according to the specification herein, and silver powder, melted into aluminum. The plates may be formed by hot rolling ingots of the alloy or may be formed by casting from the molten alloy. Thickness of the finished plates will vary according to particular application, including body armor, vehicle armor or armor to be employed in structures such as buildings or portions or buildings.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

The present invention relates to solid-material compositions having enhanced physical and electrical properties as well as products formed using the material and methods for making the material and the products.

Numerous products can be made using the composition of the present invention. One aspect of the present invention includes a wash or bath employed to treat ingredients used to form the ballistic strike plates and assemblies according to the present invention. Since the volume of the wash or bath will vary with the particular application, an illustrative example is given for formulating the wash using one gallon of acetone. Persons skilled in the art will appreciate that the amounts of the ingredients disclosed in the example can be linearly scaled to formulate larger or smaller batches of the wash.

Figure 1:
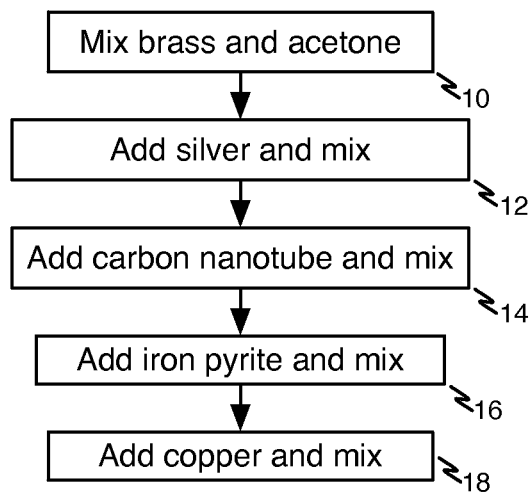
FIG. 1 is a diagram illustrating a process for making a treating wash according to one aspect of the present invention.

In one illustrative example shown in FIG. 1, at reference numeral 10, brass is mixed with acetone in a commercial blender. In the example, about 454 grams of brass (about 100 mesh or finer) is mixed with one gallon of acetone in a commercial blender at high speed for about 10 minutes or until a gold color appears at the surface of the acetone when the blender is stopped. At reference numeral 12, about 2 grams of silver granules are added and mixed. At reference numeral 14, carbon nanotube material is added and mixed. In the illustrative example, about one gram of multi-walled carbon nanotube material is added and mixed at high speed for about 5 minutes. At reference numeral 16, iron pyrite is added and mixed. In the illustrative example, about 33.5 grams of iron pyrite having a grain size of about 0.125 inch is added and mixed for a minimum of about 3 minutes at high speed. At reference numeral 18, copper is added and mixed. In the illustrative example, about 517 grams of copper (about 100 mesh or finer) is added and mixed at high speed for about 8 minutes until a slurry begins to form on the surface after the blender is turned off. The order in which the carbon nanotube material, the silver, the iron pyrite, and the copper are added is not critical.

After the ingredients have all been mixed as described, the liquid is strained and may be used as a wash or bath. All of the strained solid matter may be stored for further use as disclosed herein. Once materials are processed, the wash liquid used may be collected and recycled by adding it to new batches of the wash liquid.

Once the wash liquid is formulated, constituent materials of products to be fabricated are washed using it. A sticky film merges with the constituent materials. The constituent materials are bonded together by drying and application of pressure, either in an oven or at room temperature.

According to one aspect of the present invention, ballistic strike plates formed from a special aluminum alloy are advantageously employed in armor assemblies, especially body armor assemblies. Since the amount of alloy needed to form plates of particular dimensions will vary with sizes of the plates needed for the particular application, an illustrative example is given for formulating a kilogram of the alloy. Persons skilled in the art will appreciate that the amounts of the ingredients disclosed in the example can be linearly scaled to formulate larger or smaller amounts of the aluminum alloy.

For a total weight of about 1 Kg of special aluminum alloy, about 130 grams of treated material as described above (referred to herein as "treated material") and about 10 grams of silver powder are melted into about 860 grams of aluminum. The aluminum alloy formulated according to the present invention as just described is referred to herein as "special aluminum alloy."

The ballistic strike plates of the present invention may be formed by hot rolling ingots of the special aluminum alloy or may be formed by casting from the molten alloy. The ballistic strike plates of the present invention may be formed by hot rolling ingots of aluminum or other aluminum alloys or may be formed by casting from molten aluminum or other aluminum alloys but are believed to have a lower strength than the special aluminum alloy. Thickness of the finished ballistic strike plates will vary according to the particular application; for body armor the plates may be about 0.0625 inch to about 0.250 inch thick, depending on the threat level they are designed to meet. For vehicle or structure armor the ballistic strike plates may have a thickness of up to an inch or greater, depending on the threat level they are designed to meet.

Figures 2A, 2B:
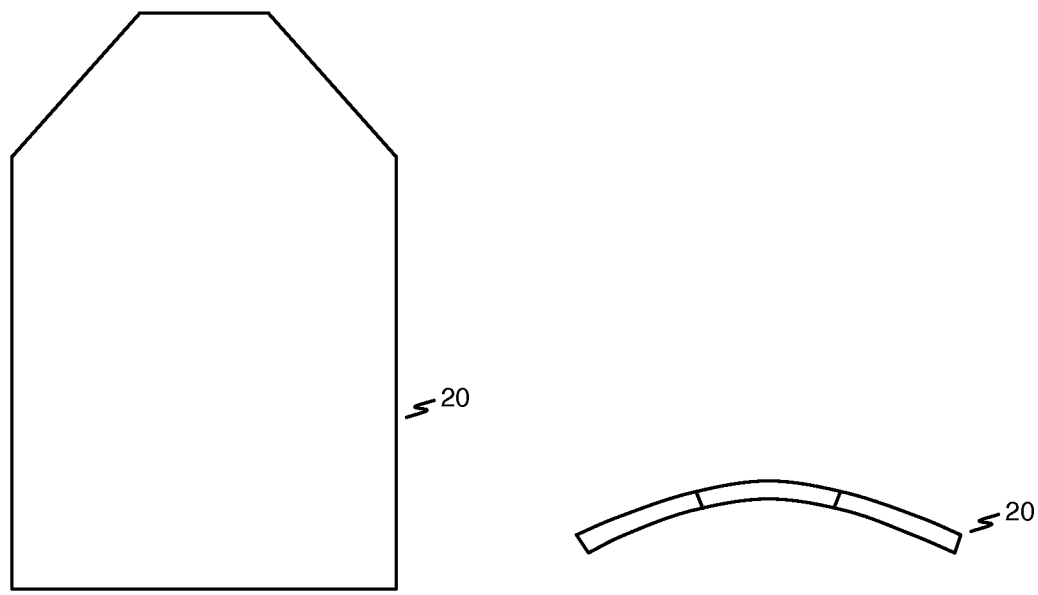
FIGS. 2A and 2B are diagrams illustrating front and top views of a ballistic strike plate assembly according to another aspect of the present invention.

Referring now to FIGS. 2A and 2B, the composition is usefully employed to form a ballistic strike plate 20 that may be used in body armor according to another aspect of the present invention. FIG. 2A shows a front view of a ballistic strike plate assembly according to the present invention. FIG. 2B shows an illustrative top view of strike plate assembly 20. While the illustrative bottom view shown in FIG. 2A indicates that plate 20 is curved, persons of ordinary skill in the art will appreciate that plate 90 may be formed flat, depending on the application. For example, body-armor vests are sometimes constructed by supplying a vest made from a fabric material. The vests contain pockets into which ballistic strike plates or plate assemblies are inserted. The ballistic strike plate assemblies according to the present invention include assemblies formed in this manner and configured to be inserted into the pockets of such fabric vests.

Figure 3A:
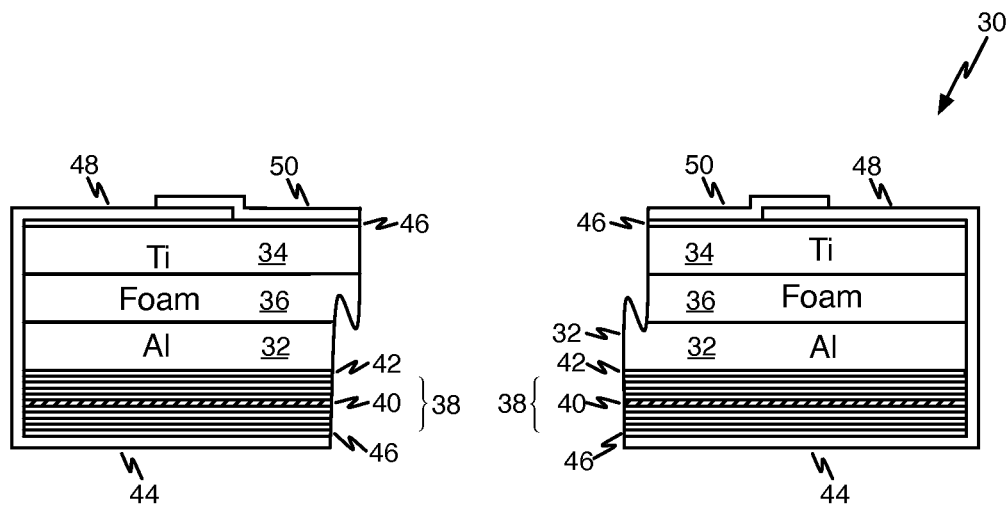
FIGS. 3A and 3B are diagrams illustrating a ballistic strike plate assembly according to another aspect of the present invention.
Figure 3B:
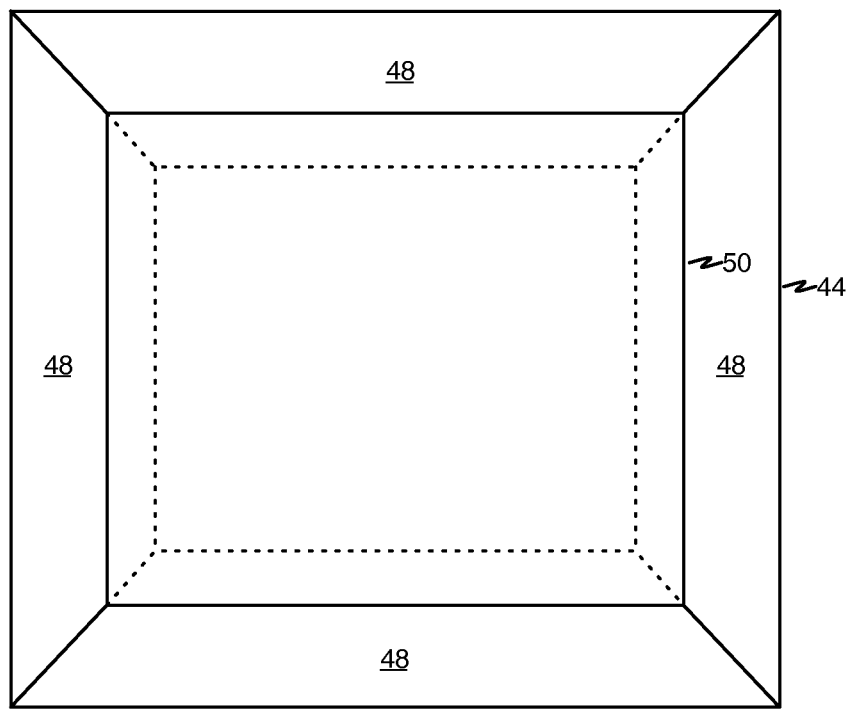

Referring now to FIGS. 3A and 3B, diagrams illustrate a cross-sectional view and a face view, respectively, of a ballistic strike plate assembly 30 according to another aspect of the present invention.

An illustrative ballistic plate assembly according to the present invention is formed using a special aluminum alloy plate 32 made according to the present invention. In one illustrative embodiment of the invention, plate 32 may have a thickness of about 0.125 inches. A grade II titanium plate 34 such as a 0.125 inch thick plate CAS 7440-32-6 available from Allegheney Ludlum Corp., of Brackenridge, Pa. is also used. While in the present example the two plates have the same thickness, this is not necessary for practicing the present invention. Persons of ordinary skill in the art will recognize that the thicknesses of plates 32 and 34 will be selected according to the threat level to which the ballistic strike plate assembly will be designed to encounter.

A sheet of ballistic gap foam 36, having a thickness of about 0.125 inches in an illustrative embodiment, having adhesive disposed on both surfaces, such as model DMG-FM-004, manufactured by DMG, a division of Hisco, of Tempe Ariz., is adhered to a first surface of one of the plates. A first surface of the other plate is adhered to the other surface of the foam sheet 36.

A ballistic fabric plate 38 is made using multiple layers of a ballistic fabric such as Spectra II available from Honeywell of Colonial Heights, Va. In a presently preferred embodiment, a first stack of a plurality of layers of such fabric. A sheet 40, formed from a material such as a titanium sheet, having a thickness of about 0.05 inches in an illustrative embodiment, such as a CAS 7440-32-6 plate from Allegheny Ludlum Corp. of Brackenridge, Pa., is placed over the stack and a second stack of a plurality of layers of such fabric are placed over the titanium sheet. In one illustrative embodiment of the invention, fifty sheets are employed in the first and second stacks. The assembled stacks are then heated to about 275° F. for about four hours under a pressure of, for example, 10 tons to form a ballistic fabric plate. The ballistic fabric plate is adhered to the exposed second surface of the aluminum plate 32 using a double-sided adhesive tape 42, such as 3M-VHB 4950, available from 3M Corporation of St. Paul, Minn.

The ballistic plate assembly 30 is then covered with a first sheet 44 of ballistic wrap such as M-7 Spall System Nylon PSA from DMG a division of Hisco of Tempe Ariz. The first sheet 44 of ballistic wrap is held in place by a layer of adhesive 46. The edges 48 of the first sheet of ballistic wrap 44 are folded over the four edges of the assembly. A second smaller sheet of ballistic wrap 50 is placed over the portion of the second surface of the aluminum plate not covered by the folded over edges of the first sheet of ballistic wrap. The second sheet 50 of ballistic wrap is also held in place by a layer of adhesive 46. The titanium face of the assembly faces outward towards the threat.

Figure 4A:
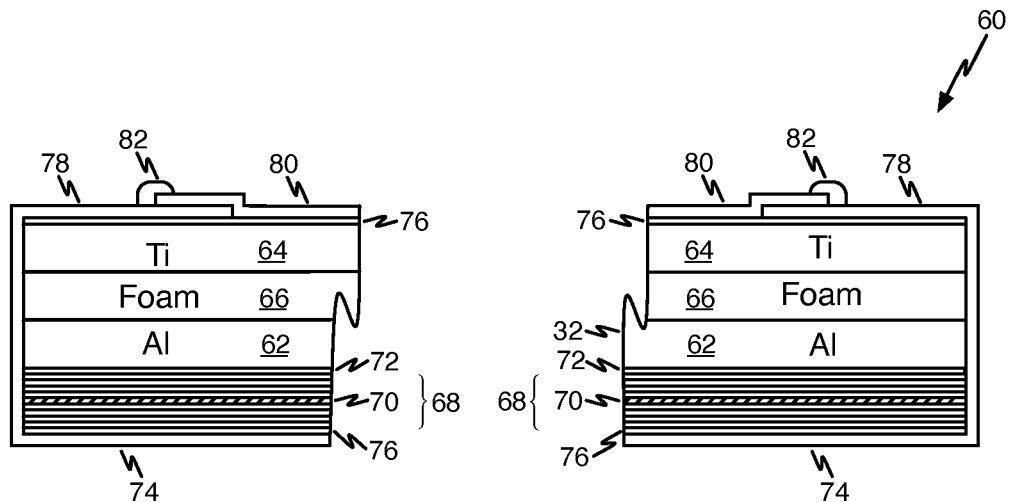
FIGS. 4A and 4B are diagrams illustrating a ballistic strike plate assembly according to another aspect of the present invention.
Figure 4B:
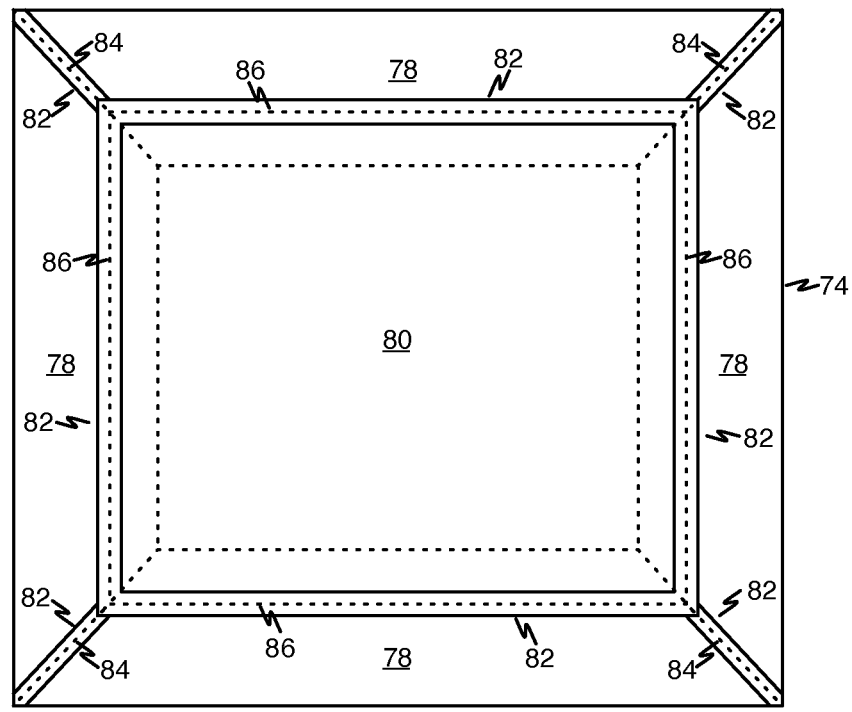

Referring now to FIGS. 4A and 4B, diagrams illustrate a cross-sectional view and a face view, respectively, of a body-armor plate assembly according to another aspect of the present invention.

According to the aspect of the present invention illustrated in FIGS. 4A and 4B, an armor plate assembly 60 is formed using a special aluminum alloy plate 62 made according to the teachings of the present invention. In one illustrative embodiment of the invention, plate 22 may have a thickness of about 0.125 inches. A grade II titanium plate 64 such as a 0.125 inch thick plate CAS 7440-32-6 available from Allegheney Ludlum Corp., of Brackenridge, Pa. While in the present example the two plates have the same thickness, this is not necessary for practicing the present invention. Persons of ordinary skill in the art will recognize that the thicknesses of plates 62 and 64 will be selected according to the threat level to which the ballistic strike plate assembly will be designed to encounter.

A first surface of a sheet of ballistic gap foam 66, having a thickness of about 0.125 inches in an illustrative embodiment, having adhesive disposed on both faces, such as model DMG-FM-004, manufactured by DMG, a division of HISCO, of Tempe Ariz., is adhered to a first surface of one of the plates 62 and 64. A first surface of the other plate is adhered to the other surface of the foam sheet 66.

A ballistic backing plate 68 is made using multiple layers of a ballistic fabric such as Spectra II available from Honeywell of Colonial Heights, Va. In a presently preferred embodiment, a stack is assembled from a plurality of layers of such fabric. A sheet 70 formed from a material such as a titanium sheet, having a thickness of about 0.05 inches in an illustrative embodiment, such as a CAS 7440-32-6 plate from Allegheny Ludlum Corp. of Brackenridge, Pa. is placed over the stack and a second stack of a plurality of layers of such fabric are placed over the titanium sheet. In one illustrative embodiment of the invention, fifty sheets are employed in the first and second stacks. The assembled stacks are then heated to about 275° F. for about four hours under a pressure of, for example, 10 tons to form ballistic fabric plate 68. The ballistic fabric plate 68 is adhered to the exposed second surface of the aluminum plate 62 using a double sided adhesive tape, such as 3M-VHB 4950, available from 3M Corporation of St. Paul, Minn.

The ballistic plate assembly 60 is then covered with a first sheet 74 of ballistic wrap such as M-7 Spall System Nylon PSA from DMG a division of Hisco of Tempe Ariz. The first sheet 74 of ballistic wrap is held in place by a layer of adhesive 76. The edges 78 of the first sheet of ballistic wrap 74 are folded over the four edges of the assembly. A second smaller sheet of ballistic wrap 80 is placed over the portion of the second surface of the aluminum plate not covered by the folded over edges of the first sheet of ballistic wrap. The second sheet 80 of ballistic wrap is also held in place by a layer of adhesive 76. The titanium face of the assembly faces outward towards the threat.

A coating 82, for example an elestomeric coating such as Plasti-Dip coating from Plasti-Dip International of Blaine, Minn., is formed over the seams 84 made by the intersection of the edges of folded-over portions 78 of the first sheet of ballistic wrap layer 74 and at the outer edges 86 of the second sheet 80 of the ballistic wrap.

The foregoing disclosure includes illustrative embodiments of the invention. The thicknesses of the various layers in any actual embodiment of the invention will be selected according to the threat level to which the ballistic strike plate assembly will be designed to encounter.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A ballistic strike plate assembly, comprising:
   a multilayer ballistic strike plate having opposed first and second surfaces;
   a first sheet of ballistic wrap disposed over the first surface of the multilayer ballistic strike plate, the first sheet of ballistic wrap having edges extending beyond edges of the first surface of the multilayer ballistic strike plate, the edges of the first sheet of ballistic wrap folded over all of the edges and all of the sides of the multilayer ballistic strike plate and disposed over the second surface of the multilayer ballistic strike plate; and
   a second sheet of ballistic wrap disposed only over the second surface of the multilayer ballistic strike plate over a portion of the second surface of the multilayer ballistic strike plate not covered by the folded over edges of the first sheet of ballistic wrap with edges of the second sheet of ballistic wrap extending beyond the edges of the first sheet of ballistic wrap.

2. The ballistic strike plate assembly of claim 1, further including an elastomeric material disposed over seams between the first and second sheets of ballistic wrap.

3. The ballistic strike plate assembly of claim 1 having a length and width selected to fit in a strike-plate pocket of an armor vest.

4. The ballistic strike plate assembly of claim 1, wherein:
   the ballistic strike plate assembly is configured to perform to a selected threat level; and
   the multilayer ballistic strike plate has a thickness selected for the selected threat level.

5. A ballistic strike plate assembly, comprising:
   a first plate formed from special aluminum alloy and having a first surface and a second surface, wherein the special aluminum alloy is formed from treated material comprising brass granules, carbon nanotube material, and copper granules pre-treated in a solvent, wherein the treated material is melted into aluminum;
   a second plate formed from titanium and having a first surface and a second surface;
   a sheet of ballistic gap foam disposed between the first surface of the first plate and the first surface of the second plate;
   a multilayer ballistic fabric plate adjacent to the second surface of the first plate;
   a first sheet of ballistic wrap disposed over the multilayer ballistic fabric plate, the first sheet of ballistic wrap having edges extending beyond edges of a first surface of the multilayer ballistic fabric plate, the edges of the first sheet of ballistic wrap folded over the edges of the second plate and disposed over the second surface of the second plate; and
   a second sheet of ballistic wrap disposed only over a portion of the second surface of the second plate not covered by the folded over edges of the first sheet of ballistic wrap with edges of the second sheet of ballistic wrap extending beyond the edges of the first sheet of ballistic wrap.

6. The ballistic strike plate assembly of claim 5, wherein the multilayer ballistic fabric plate is formed from a first plurality of sheets of ballistic fabric forming a first stack, a second plurality of sheets of ballistic fabric forming a second stack, and includes a metallic sheet disposed between the first and second stacks.

7. The ballistic strike plate assembly of claim 5, further including an elastomeric material disposed over seams between the first and second sheets of ballistic wrap.

8. The ballistic strike plate assembly of claim 5, wherein the titanium plate has a thickness of about 0.05 inches.

9. The ballistic strike plate assembly of claim 5 having a length and width selected to fit in a strike-plate pocket of an armor vest.

10. The ballistic strike plate assembly of claim 5, wherein:
    the ballistic strike plate is configured to perform to a selected threat level; and
    the first plate, the second plate, and the multilayer ballistic fabric plate each have a thickness selected for the selected threat level.

11. The ballistic strike plate assembly of claim 5, wherein the multilayer ballistic fabric plate is formed from a plurality of sheets of ballistic fabric forming a stack.

12. The ballistic strike plate assembly of claim 5, wherein the thickness of the first plate is at least 0.0625 inch.

13. The ballistic strike plate assembly of claim 5, wherein the thickness of the first plate is between 0.0625 inch and 0.250 inch.

14. The ballistic strike plate of claim 5, wherein the thickness of the first plate is greater than 1 inch.

15. A ballistic strike plate assembly comprising:
    a first plate formed from an alloy of aluminum including brass granules, carbon nanotube material, and copper granules pre-treated in a solvent, the first plate having a first surface and a second surface;
    a second plate formed from titanium and having a first surface and a second surface;
    a sheet of ballistic gap foam disposed between the first surface of the first plate and the first surface of the second plate;
    a multilayer ballistic fabric plate adjacent to the second surface of the first plate;
    a first sheet of ballistic wrap disposed over the multilayer ballistic fabric plate, the first sheet of ballistic wrap having edges extending beyond edges of a first surface of the multilayer ballistic fabric plate, the edges of the first sheet of ballistic wrap folded over the edges of the second plate and disposed over the second surface of the second plate; and a second sheet of ballistic wrap disposed only over a portion of the second surface of the second plate not covered by the folded over edges of the first sheet of ballistic wrap with edges of the second sheet of ballistic wrap extending beyond the edges of the first sheet of ballistic wrap.

16. The ballistic strike plate assembly of claim 15, wherein the multilayer ballistic fabric plate is formed from a first plurality of sheets of ballistic fabric forming a first stack, a second plurality of sheets of ballistic fabric forming a second stack, and includes a metallic sheet disposed between the first and second stacks.

17. The ballistic strike plate assembly of claim 15, further including an elastomeric material disposed over seams between the first and second sheets of ballistic wrap.

18. The ballistic strike plate assembly of claim 15 having a length and width selected to fit in a strike-plate pocket of an armor vest.

19. The ballistic strike plate assembly of claim 15, wherein the thickness of the first plate is at least 0.0625 inch.

20. The ballistic strike plate assembly of claim 15, wherein the thickness of the first plate is between 0.0625 inch and 0.250 inch.

21. The ballistic strike plate of claim 15, wherein the thickness of the first plate is greater than 1 inch.

22. The ballistic strike plate assembly of claim 15, wherein:
the ballistic strike plate is configured to perform to a selected threat level; and
the first plate, the second plate, and the multilayer ballistic fabric plate each have a thickness selected for the selected threat level.

* * * * *